US009416920B2

(12) United States Patent
Veinbergs

(10) Patent No.: US 9,416,920 B2
(45) Date of Patent: Aug. 16, 2016

(54) ADJUSTABLE LIQUID STRAINER

(71) Applicant: Edgar Veinbergs, Big Horn, WY (US)

(72) Inventor: Edgar Veinbergs, Big Horn, WY (US)

( * ) Notice: Subject to any disclaimer, the term of this patent is extended or adjusted under 35 U.S.C. 154(b) by 575 days.

(21) Appl. No.: 13/790,677

(22) Filed: Mar. 8, 2013

(65) Prior Publication Data

US 2014/0083516 A1 Mar. 27, 2014

Related U.S. Application Data

(60) Provisional application No. 61/635,715, filed on Apr. 19, 2012.

(51) Int. Cl.
*F17D 1/08* (2006.01)
*B01D 37/00* (2006.01)
*B01D 35/02* (2006.01)

(52) U.S. Cl.
CPC ............. *F17D 1/08* (2013.01); *Y10T 137/0318* (2015.04); *Y10T 137/0402* (2015.04); *Y10T 137/794* (2015.04); *Y10T 137/85978* (2015.04)

(58) Field of Classification Search
None
See application file for complete search history.

(56) References Cited

U.S. PATENT DOCUMENTS 160,163 A * 2/1875 Colgrove ............ E05B 65/0841 210/469
304,318 A * 9/1884 Hean .................... B01D 29/111 210/460
344,813 A * 7/1886 Bull .......................... E02B 9/04 210/266
539,800 A * 5/1895 Durant ................ B01D 29/111 166/230
616,364 A * 12/1898 Shreeve ............... B01D 24/004 126/285 R
704,012 A * 7/1902 Emerson .............. B01D 29/111 210/460

(Continued)

FOREIGN PATENT DOCUMENTS

JP 08006482 Y 2/1996
WO WO9823545 6/1998
WO WO2011137425 11/2011

*Primary Examiner* — Robert James Popovics

(74) *Attorney, Agent, or Firm* — Terrence M. Wyles, Esq.; Startup IP Law, LLC

(57) ABSTRACT

Provided herein is a shallow-liquid strainer apparatus with an intake assembly that can be adjusted to keep the inlet opening completely submerged beneath the surface of the liquid to avoid letting the surrounding atmosphere into the device where it can cause inefficient flow. The intake assembly can comprise a sliding door on tracks designed to cover all or a portion of the inlet. The apparatus can be connected to a pump. The wall of the device on which the inlet is located and the inlet itself can be angled toward the back wall to facilitate submerging of the inlet. The device can comprise a strainer attached to the inlet for removing undesirable elements from the liquid. A ramp can be provided near the inlet to allow the liquid to flow upward toward the outlet. Methods of making the device are also provided.

20 Claims, 4 Drawing Sheets

(56) References Cited

U.S. PATENT DOCUMENTS 705,364 A * 7/1902 Kurtz ........ C02F 3/327 210/170.01
756,517 A * 4/1904 Miller ........ A01J 11/12 137/131
857,519 A * 6/1907 Foster ........ F16L 55/24 137/140
882,098 A * 3/1908 Chial ........ E03C 1/042 137/342
950,715 A * 3/1910 Brindle ........ 210/463
969,364 A * 9/1910 Groothehuis ...... B01D 33/0087 210/354
1,378,929 A * 5/1921 Wurscher ........ F04B 53/1037 137/140
1,451,394 A * 4/1923 Hurst ........ E02B 1/006 210/162
1,579,917 A * 4/1926 Deming ........ F04B 53/1037 210/242.1
1,585,409 A * 5/1926 Myers ........ E02B 13/00 210/170.1
1,621,413 A * 3/1927 James ........ F04B 53/1037 210/242.1
1,694,743 A * 12/1928 Hinman ........ F04B 53/1037 210/460
1,722,626 A * 7/1929 Dean ........ F04B 53/1037 210/247
1,810,981 A * 6/1931 Noble ........ B01D 29/11 405/127
1,945,824 A * 2/1934 Saxe ........ F04B 53/1037 210/247
1,953,331 A * 4/1934 Armstrong ........ A62C 3/0292 169/30
1,967,785 A * 7/1934 Schacht ........ E03C 1/086 210/451
1,971,733 A * 8/1934 Shimer ........ F04B 53/1037 210/447
2,015,274 A * 9/1935 Milton ........ B05B 15/00 210/250
2,022,336 A * 11/1935 Bower ........ B01D 33/0016 210/157
2,024,646 A * 12/1935 Jones ........ B01D 23/10 210/136
2,249,020 A * 7/1941 McFarlin ........ F04B 53/1037 210/413
2,270,116 A * 1/1942 Featherston ........ F04B 53/1037 210/247
2,300,952 A * 11/1942 May ........ F04B 53/1037 210/456
2,306,986 A * 12/1942 Tolman ........ B01D 35/02 210/460
2,331,332 A * 10/1943 Latta ........ A47L 9/1427 210/448
2,371,895 A * 3/1945 Kingman ........ B01D 35/027 210/457
2,374,756 A * 5/1945 Kisch ........ B01D 29/111 210/232
2,490,443 A * 12/1949 Knipper ........ B01D 35/02 210/315
2,503,455 A * 4/1950 Sheren ........ A62C 33/00 210/318
2,580,209 A * 12/1951 Wiley ........ B01D 29/33 210/232
2,597,728 A * 5/1952 Hink ........ A62C 25/005 210/119
2,660,317 A * 11/1953 Mork ........ B01D 35/02 210/434
2,754,003 A * 7/1956 Fenner ........ D06F 9/10 137/493.9
2,783,893 A * 3/1957 Romanoff ........ A01K 63/04 210/167.25
2,877,903 A * 3/1959 Veres ........ B01D 35/02 210/172.4
2,957,579 A * 10/1960 Walter ........ F04D 29/708 210/242.1
2,996,189 A * 8/1961 Salterbach ........ B01D 29/05 210/155
3,037,636 A * 6/1962 McFarlin ........ F04B 53/1037 137/549
3,040,898 A * 6/1962 Simmons ........ B01D 21/02 210/312
3,109,812 A * 11/1963 Mcaulay ........ F04D 29/708 210/242.1
3,163,229 A * 12/1964 Salisbury ........ B01D 29/114 166/234
3,206,036 A * 9/1965 Hawley ........ E01H 1/108 210/460
3,291,313 A * 12/1966 Davis ........ B01D 33/067 210/250
3,495,714 A * 2/1970 Barton ........ A62C 33/00 210/460
3,513,978 A * 5/1970 Newsteder ........ A01K 63/045 119/261
3,556,301 A * 1/1971 Smith ........ E02B 15/06 210/242.3
3,613,894 A * 10/1971 Clegg, Jr. ........ A62C 33/00 210/276
3,643,802 A * 2/1972 Jackson, Jr. ........ B63B 13/02 210/172.3
3,674,148 A * 7/1972 Miller ........ B01D 29/01 210/409
3,675,778 A * 7/1972 Hoag ........ B01D 21/0012 210/237
3,690,463 A * 9/1972 O'Brien ........ E02B 15/106 210/242.3
3,722,686 A * 3/1973 Arnett ........ B01D 29/0018 210/170.09
3,744,640 A * 7/1973 Grover ........ B01D 39/1661 210/172.3
3,745,115 A * 7/1973 Olsen ........ E02B 15/106 210/119
3,752,320 A * 8/1973 Biro ........ A47G 19/2211 210/469
3,759,330 A * 9/1973 Rainey ........ B64D 1/16 169/13
3,782,552 A * 1/1974 Wendell ........ B65D 88/54 210/242.1
3,794,446 A * 2/1974 Ost ........ F04B 53/1037 210/242.1
4,017,394 A * 4/1977 Hensley ........ B01D 33/073 210/157
4,152,264 A * 5/1979 Hanna, Sr. ........ B01D 21/0012 210/170.09
4,179,379 A * 12/1979 Mitchell ........ B01D 29/009 210/242.1
4,210,539 A * 7/1980 Shiban ........ B01D 33/067 210/391
4,245,924 A * 1/1981 Fouss ........ B29C 65/02 138/119
4,261,822 A * 4/1981 Richardson ........ B01D 33/073 210/107
4,310,423 A * 1/1982 Brown ........ B01D 29/01 210/242.1
4,357,238 A * 11/1982 Ziaylek, Jr. ........ A62C 33/00 210/232
4,360,427 A * 11/1982 Posgate ........ B01D 21/0042 210/170.1
4,376,053 A * 3/1983 Bullock ........ A01J 5/0134 119/14.16
4,559,138 A * 12/1985 Harms, II ........ B01D 29/21 210/316
4,560,476 A * 12/1985 Nishimori ........ B01D 35/26 210/416.1
4,617,120 A * 10/1986 Barzuza ........ B01D 29/05 210/409
4,640,771 A * 2/1987 Whalen ........ B01D 29/15 210/167.01
4,647,374 A * 3/1987 Ziaylek ........ B01D 35/05 210/242.1
4,740,317 A * 4/1988 Yost ........ B01D 29/0077 210/196
4,783,258 A * 11/1988 Willinger ........ A01K 63/045 210/167.22
4,851,118 A * 7/1989 Kurihara ........ B01D 29/15 210/315

(56) References Cited

U.S. PATENT DOCUMENTS 4,874,510 A * 10/1989 Akira ..................... B01D 29/15 210/172.4
4,973,403 A * 11/1990 Kozey ................... F04D 29/708 169/13
4,973,405 A * 11/1990 Kozey .................... B01D 29/33 169/30
5,082,013 A * 1/1992 Scheib ................... A62C 35/20 137/1
5,156,738 A * 10/1992 Maxson ................. B01D 24/22 210/274
5,215,656 A * 6/1993 Stoneburner ......... B01D 33/073 210/170.09
5,227,050 A * 7/1993 Stephan ............. B01D 17/0214 210/106
5,257,643 A * 11/1993 Merrett ................... E02B 13/02 137/236.1
5,269,338 A * 12/1993 Figas ................... A01K 63/006 119/245
5,290,436 A * 3/1994 Danner ................ A01K 63/045 119/259
5,300,225 A * 4/1994 Fischer ................ B01D 33/073 210/391
5,311,811 A * 5/1994 Kuzyk ................. C12G 1/0206 210/242.1
5,392,806 A * 2/1995 Gallant ..................... E03B 3/04 137/236.1
5,431,816 A * 7/1995 Aldred ................... B01D 35/26 210/416.3
5,435,464 A * 7/1995 Alexander .......... B05B 11/0043 222/105
5,496,468 A * 3/1996 Cormier ................. B01D 29/33 210/172.3
5,509,437 A * 4/1996 Merrett .................. A62C 35/68 137/15.02
5,525,222 A * 6/1996 Gleason ............... B01D 29/114 210/170.01
5,618,426 A * 4/1997 Eischen ................. B01D 24/12 210/289
5,650,073 A * 7/1997 Merrett .................. B01D 29/33 137/236.1
5,653,874 A * 8/1997 Berry, III ............... B01D 29/05 210/159
5,665,248 A * 9/1997 McKiddy, II ......... E04H 4/1218 15/421
5,711,886 A * 1/1998 Long ...................... B01D 29/35 210/170.09
5,723,044 A * 3/1998 Gleason ............... B01D 29/114 210/170.09
5,797,421 A * 8/1998 Merrett .................. A62C 35/68 137/236.1
5,820,751 A * 10/1998 Faircloth, Jr. ...... B01D 21/2444 210/122
5,851,087 A * 12/1998 Berry, III ............... B01D 29/15 210/154
5,851,385 A * 12/1998 Merrett .................. B01D 29/33 137/236.1
5,922,197 A * 7/1999 Sparks ...................... E03F 7/00 210/232
5,935,439 A * 8/1999 Hart ....................... B01D 29/33 210/346
5,958,234 A * 9/1999 Dwyer ................. G21C 19/307 210/315
6,036,850 A * 3/2000 Reynolds ............... B01D 29/15 210/117
6,051,131 A * 4/2000 Maxson ............... B01D 29/114 210/162
6,054,045 A * 4/2000 Wittstock ........... B01D 21/0012 210/167.01
6,089,790 A * 7/2000 Berry, III ............... B01D 29/15 138/41
6,126,016 A * 10/2000 Graham .................... B07B 1/12 209/385
6,251,266 B1 * 6/2001 Gannon ............. B01D 17/0214 210/122
6,386,049 B1 * 5/2002 Schrumm ................. G01F 1/46 73/861.66
6,401,829 B1 * 6/2002 Newton ................. A62C 27/00 169/13
6,440,303 B2 * 8/2002 Spriegel ................. B01D 29/15 137/140
6,478,954 B1 * 11/2002 Turner, Jr. .............. B01D 35/02 210/131
6,488,846 B1 * 12/2002 Marangi ................ B01D 29/15 210/232
6,491,818 B2 * 12/2002 Dwyer ................. G21C 19/307 210/315
6,508,933 B2 * 1/2003 Wilkins ................. B01D 29/05 210/170.09
6,572,763 B2 * 6/2003 Gorshing ............. B01D 29/115 210/159
6,638,435 B2 * 10/2003 Loreno ................ B01D 35/027 210/117
6,682,651 B1 * 1/2004 Toland ................... B01D 29/15 210/155
6,712,959 B2 * 3/2004 Ekholm ............... B01D 29/114 210/162
6,764,596 B2 * 7/2004 Tucker ..................... E02B 3/023 210/162
6,936,163 B2 * 8/2005 Use .................... B01D 21/0012 210/131
6,939,461 B2 * 9/2005 Use .................... B01D 21/0012 210/131
6,949,198 B2 * 9/2005 Reber .................... A62C 33/00 210/170.09
6,953,528 B2 * 10/2005 Nesfield .................. E02B 3/023 210/154
6,955,759 B2 * 10/2005 Patrick ................... A01K 61/00 119/219
6,978,900 B2 * 12/2005 Natale .................. B01D 29/111 210/483
RE38,989 E * 2/2006 Wittstock ........... B01D 21/0012 210/167.01
7,144,501 B2 * 12/2006 Beaulieu ................ A01K 63/04 210/167.01
7,165,913 B2 * 1/2007 Allard .................... B01D 29/54 405/43
7,201,842 B2 * 4/2007 Kiefer .................. B01D 29/085 210/162
7,211,190 B2 * 5/2007 Kielbowicz .......... B01D 29/031 210/232
7,273,545 B1 * 9/2007 Lloyd .................. A01K 63/045 210/162
7,501,058 B1 * 3/2009 Lawrence, Sr. ........ B01D 29/33 210/232
7,575,677 B1 * 8/2009 Barnes ................. B01D 29/111 210/170.01
7,615,148 B1 * 11/2009 Gentry ................... B01D 35/02 210/170.07
7,662,280 B1 * 2/2010 Cooney ................. E02D 31/004 210/143
7,754,073 B2 * 7/2010 Nielsen ............. B01D 21/0027 210/170.04
7,780,013 B1 * 8/2010 Kern ...................... A62C 33/00 137/272
7,794,589 B2 * 9/2010 Kozey .................... B01D 35/05 210/122
7,822,164 B1 * 10/2010 Kielbowicz .......... B01D 29/031 210/484
7,867,395 B2 * 1/2011 Ekholm ............... B01D 29/114 210/333.01
7,950,527 B2 * 5/2011 Osborne ............. B01D 29/114 210/172.3
8,054,932 B2 * 11/2011 Smith .................... B01D 35/02 210/167.01
8,075,700 B2 * 12/2011 Ekholm ............... B01D 29/114 134/22.12
8,083,939 B2 * 12/2011 Dowsett ................. B01D 29/48 210/232
8,192,622 B2 * 6/2012 Kozey .................... B01D 29/33 210/232
8,282,836 B2 * 10/2012 Feher ........................ E02B 9/04 210/159

(56) References Cited

U.S. PATENT DOCUMENTS 8,292,089 B2 * 10/2012 Osborne .............. B01D 29/114 210/170.09
8,297,448 B2 * 10/2012 Watson ..................... E02B 5/08 210/170.09
8,631,815 B2 * 1/2014 VanConett .............. F04B 23/02 137/236.1
8,636,898 B2 * 1/2014 Perez ..................... B01D 29/23 210/149
8,652,324 B2 * 2/2014 Wietharn ............. B01D 33/073 210/170.05
8,834,713 B1 * 9/2014 Merrett ................ B01D 35/153 210/117
8,877,054 B2 * 11/2014 Andersen ............. B01D 35/303 210/232
8,961,786 B1 * 2/2015 Farmer .................... A47J 43/24 209/258
9,023,198 B2 * 5/2015 Wietharn ............. B01D 33/073 210/170.05
9,255,372 B2 * 2/2016 Whitaker ................ E02B 5/085
9,279,225 B1 * 3/2016 Prokupek ................ E03F 5/105
2001/0054591 A1 * 12/2001 Gorshing ............. B01D 29/115 210/769
2002/0020678 A1 * 2/2002 Loreno ................ B01D 35/027 210/767
2003/0029780 A1 * 2/2003 Ekholm ............... B01D 29/114 210/162
2004/0007518 A1 * 1/2004 Natale .................. B01D 29/111 210/354
2004/0164031 A1 * 8/2004 Reber .................... A62C 33/00 210/767
2004/0200766 A1 * 10/2004 Patrick ................... A01K 61/00 210/153
2005/0016930 A1 * 1/2005 Nesfield .................. E02B 3/023 210/747.5
2005/0167355 A1 * 8/2005 Kielbowicz .......... B01D 29/031 210/416.1
2006/0078387 A1 * 4/2006 Allard .................... B01D 29/54 405/45
2006/0289346 A1 * 12/2006 Kiefer .................. B01D 29/085 210/167.1
2007/0017549 A1 * 1/2007 Ekholm ............... B01D 29/114 134/10
2007/0175834 A1 * 8/2007 Osborne .............. B01D 29/114 210/767
2007/0267340 A1 * 11/2007 Bleigh ................... B01D 29/15 210/486
2007/0274784 A1 * 11/2007 Allard .................... B01D 29/54 405/45
2008/0061010 A1 * 3/2008 Tom ..................... A01K 63/045 210/767
2008/0190838 A1 * 8/2008 Reardon ............... F04D 29/708 210/416.1
2009/0178974 A1 * 7/2009 Leonardich ............ B01D 29/15 210/651
2009/0301960 A1 * 12/2009 Blottiere ................ B01D 29/03 210/409
2010/0059432 A1 * 3/2010 Kozey .................... B01D 35/05 210/242.1
2011/0056526 A1 * 3/2011 Ekholm ............... B01D 29/114 134/37
2011/0233132 A1 * 9/2011 Wietharn ............. B01D 33/073 210/403
2011/0240543 A1 * 10/2011 Kozey .................... B01D 29/33 210/232
2011/0266201 A1 * 11/2011 Perez ..................... B01D 29/23 210/171
2011/0290743 A1 * 12/2011 Osborne .............. B01D 29/114 210/767
2012/0187676 A1 * 7/2012 VanConett .............. F04B 23/02 285/328
2012/0216837 A1 * 8/2012 Kovarik ................ E04H 4/1636 134/21
2012/0298568 A1 * 11/2012 Winther ................. B01D 35/02 210/162
2013/0001148 A1 * 1/2013 Osborne .............. B01D 29/114 210/323.1
2013/0048551 A1 * 2/2013 Maxson ................. B01D 35/02 210/323.2
2013/0061421 A1 * 3/2013 Schuler .................. B01D 35/02 15/405
2013/0081993 A1 * 4/2013 Freakes .................. B01D 35/02 210/351
2013/0098823 A1 * 4/2013 Davidian ........... B01D 21/0012 210/242.3
2013/0206184 A1 * 8/2013 Nair ........................ B08B 3/024 134/34
2013/0206706 A1 * 8/2013 Ekholm ................. B01D 29/66 210/797
2014/0083516 A1 * 3/2014 Veinbergs ................. F17D 1/08 137/15.01
2014/0102960 A1 * 4/2014 Perez ..................... B01D 29/23 210/86
2014/0138300 A1 * 5/2014 Wietharn ............. B01D 33/073 210/242.1
2014/0197091 A1 * 7/2014 Andersen ............. B01D 35/303 210/323.2
2014/0199178 A1 * 7/2014 Perez ..................... B01D 35/26 417/40
2014/0305880 A1 * 10/2014 Roche .................... B01D 35/02 210/747.5
2014/0374340 A1 * 12/2014 Whitaker ................ E02B 5/085 210/499
2015/0122716 A1 * 5/2015 Reber ....................... F04F 5/10 210/232

* cited by examiner

A
22
16
52
48
76
50
51
Detail A-1
B
52
76
16
22
Detail A-1
52
76

ADJUSTABLE LIQUID STRAINER

CROSS-REFERENCE TO RELATED APPLICATIONS

This application claims priority to U.S. Provisional Application No. 61/635,715 filed Apr. 19, 2012, incorporated herein by reference to the extent not inconsistent herewith.

BACKGROUND

The following patent publications may be relevant to the state of the art: JP08006482, 1996 Feb. 28, discloses an adjustable suction strainer for use in shallow water. U.S. Pat. No. 6,508,933B2, 2003 Jan. 21, discloses a self-cleaning shallow water strainer. WO2011137425, 2011 Nov. 3, discloses a liquid filtering and transfer apparatus. U.S. Pat. No. 3,495,714, 1970 Feb. 17, discloses a strainer that has a swivel adapter means which permits receiving of water from any position while still permitting the strainer to remain in a level position. WO1998023545 1998 Jun. 4 discloses a water filter apparatus comprising a deflector that separates a flow of water entering a housing through an inlet into a first portion and a second portion, and directs the first portion to a water purification material.

All references disclosed herein are incorporated by reference (to the extent not inconsistent with the disclosure hereof) for purposes of enablement and written description.

SUMMARY

An apparatus and method are provided for draining or pumping water, or other liquids, from locations such as oil and gas well sites and storage tanks, basements, backyards, loading docks, parking lots, flooded roads, sports fields, construction sites, mines, animal farms, landfills, scrap yards, backyards flooded with water, or other locations. These areas are traditionally difficult to clear, and therefore in embodiments, the apparatus comprises a strainer element. Without a strainer, contaminants such as but not limited to dirt, solid particles, debris, silt, and gas and oil by-products and other undesired chemicals can damage the pump or contaminate the outflow. The apparatus can also be used for erosion control. In such an application, the liquid can be pumped out of the housing of the apparatus away from the area to be drained and to a suitable disposal site such as but not limited to a storm water drainage system, a creek, a river, a green area or some combination thereof.

Many pumping devices, including those equipped with strainers do not work well in shallow liquids because once the liquid level falls below the top of the strainer inlet, the interior of the strainer housing is opened to the atmosphere, reducing suction of liquid and leading to the risk of cavitation. “Shallow liquid” is defined herein as liquid having a level below the top of the strainer inlet such that the strainer inlet is open to the atmosphere, and it will be appreciated that “shallow liquid” is relative to the height of the strainer apparatus, which can be built to any size or scale. The present disclosure solves the problems of shallow liquid transfer by providing a liquid intake adjustment mechanism which allows the liquid inlet to be adjustably closed and opened so that the portion of the inlet aperture exposed to the atmosphere can be closed and the portion of the inlet aperture below the liquid level can remain open. By designing the liquid intake adjustment mechanism so that the inlet is exposed only to liquid, but not to the atmosphere above the liquid, smooth operation of the apparatus in pumping and filtering water is achieved without bubbles and excess turbulence that would interfere with operation of a pump or other suction device connected to the apparatus.

A further problem is keeping the apparatus positionally stable on uneven surfaces and in turbulent liquid, which is solved herein by providing the apparatus with a base plate, adjustable stabilizing arms and or telescoping armature, or any other stabilizing means known in the art.

Provided herein is a liquid interface pumping apparatus comprising a housing; a liquid inlet aperture in said housing; a liquid outlet in said housing; and a liquid intake adjustment assembly movably attached to said housing and sized and shaped to be positioned so as to completely or substantially completely cover the liquid inlet aperture; and to be positionable to uncover any portion of the inlet aperture. “Substantially completely” covering the inlet aperture means closing it off down to all but the minimum possible pumpable liquid level. For example, if the apparatus is only capable of effectively pumping liquid having a depth of one inch, then the cover should be capable of being closed to cover the entire aperture except the portion of the aperture that lies below the water level when the water has a depth of one inch.

The apparatus can also comprise a liquid intake adjustment assembly such as a sliding door assembly comprising a set of parallel tracks; and a sliding door slidably engaged with the tracks.

In embodiments, the liquid inlet aperture is equipped with a strainer element sized to completely cover the liquid inlet aperture, the strainer element being fixedly or detachably attached to the housing. The strainer element can be a perforated plate or a diaphragm filter, or other filtering element known to the art. The apparatus can also comprise a base plate.

In an embodiment, the housing comprises side walls attached to a bottom wall and a top wall, and a back wall and an inlet wall attached to these walls, wherein the inlet wall comprises the inlet aperture. The inlet wall is positioned at an angle between about 5°and 90° with the bottom wall, and the top wall is shortened to accommodate the incline of the inlet wall so as to enclose an interior space within the housing.

The apparatus can also comprise a flow ramp disposed within the housing and angled upwardly from a point on said bottom wall proximal to the inlet wall toward the back wall, wherein the top of the ramp abuts the back wall at or above the level of the outlet. The term “proximal to the inlet wall” as used herein means closer to the inlet wall than to the back wall.

The apparatus can also comprise a pump or other suction device connected to a connector on the back wall.

In an embodiment, the apparatus is a liquid strainer comprising housing; a liquid inlet aperture in said housing; a liquid outlet in said housing; a liquid intake adjustment assembly movably attached to said housing and sized and shaped to be positioned so as to completely or substantially completely cover the liquid inlet aperture; and to be positionable to uncover any portion of the inlet aperture; and a filter element attached to the housing and capable of completely covering the inlet aperture. To “substantially completely cover” the inlet as specified herein means that the inlet is covered so as not to allow a pumpable amount of water to enter the housing, but is not necessarily completely watertight.

The strainer apparatus can be positioned in the path of a flowing liquid, such as a stream of falling water or a substantially horizontally flowing stream, oriented such that the liquid flows into the inlet aperture and through the strainer element, with strained liquid exiting through the outlet aperture.

The apparatuses hereof are useful for pumping and/or straining any kind of liquid including water and liquid hydrocarbons, or mixtures thereof, and liquids that comprise suspended particles.

Also provided herein are methods of pumping a liquid from a first location to a second location comprising connecting the apparatuses described above with a pump; immersing the apparatuses so that at least a portion of the inlet apertures of the apparatuses is beneath the liquid level; and activating the pump.

In embodiments, the apparatus can be part of a method for straining suspended objects from a liquid, in which the method also comprises equipping the inlet aperture of the apparatus with a strainer element that covers the aperture.

A method of making a pumping apparatus is also provided herein comprising providing a housing; forming a liquid inlet aperture in the housing; forming a liquid outlet in the housing; and second, movably attaching a liquid intake adjustment assembly the housing, wherein said intake adjustment assembly is sized and shaped to be positioned so as to completely or substantially completely cover the liquid inlet aperture; and to be positionable to expose any portion of the inlet aperture. The method can also comprise attaching a pump to the liquid outlet via a coupling attached to or part of the outlet and adapted to connect with the pump.

In embodiments, the liquid intake adjustment assembly can be a sliding door assembly, and the method can comprise providing a sliding door sized and shaped to at least substantially completely cover the inlet aperture; and attaching a set of parallel tracks to the housing flanking the inlet aperture, the tracks being sized and shaped to engage the sliding door so that the sliding door is slidable therein, such that the sliding door can be adjusted to cover all or any portion of the inlet aperture.

In embodiments, a strainer element can be fixedly or removably attached to the housing wherein the strainer element is sized and shaped to completely cover the liquid inlet aperture, said strainer element being fixedly or removably attached to the housing. In embodiments modular strainer elements designed to cover different sized open sections of the inlet can be removably attached to the housing.

An embodiment hereof is a liquid strainer apparatus comprising a housing, an inlet aperture in said housing equipped with a perforated plate, an outlet aperture equipped with a coupling for connecting to a pump, a flow ramp positioned between the inlet and outlet apertures, and an adjustable sliding door capable of covering all or substantially all, or any part of the inlet aperture, and tracks flanking the inlet aperture on which the sliding door is slidably movable, such that it can be slid to a position that closes off any portion of the inlet aperture that is open to the air, and allows only liquid to flow into the apparatus.

DETAILED DESCRIPTION

The following description of various specific embodiments is exemplary in nature and is in no way intended to limit the scope of the claims hereof. In embodiments, art-known equivalents of exemplified components, materials and method steps can be substituted for those specifically described herein and these embodiments are considered to fall within the scope of the claims. Embodiments including less than all the components, materials and method steps of embodiments specifically described herein are also considered to be encompassed within this disclosure.

Figure 1:
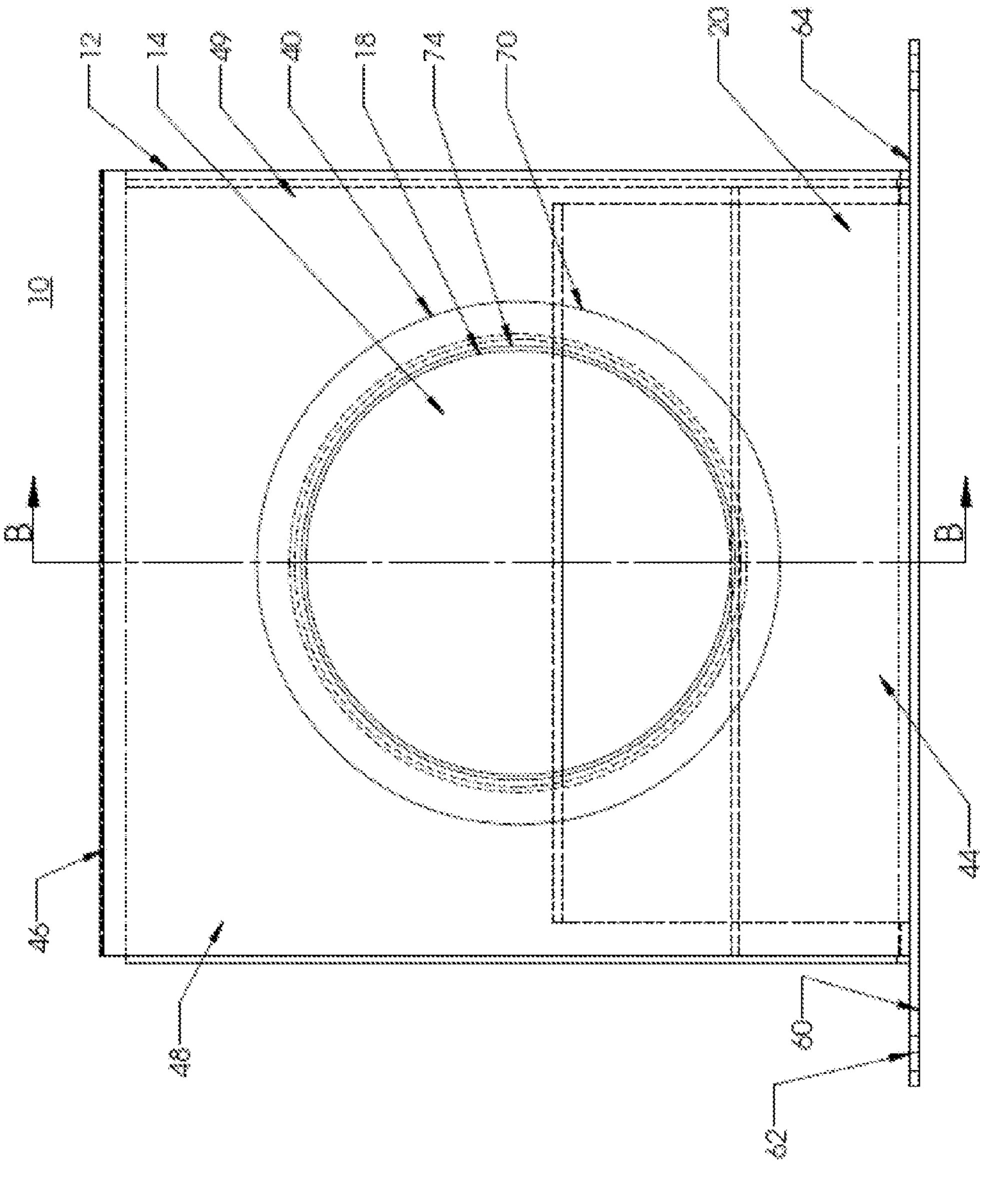
FIG. 1 is a back view of an embodiment of the strainer apparatus, illustrating the liquid outlet and details of construction.

As shown in FIG. 1, which is a back view of an embodiment of an adjustable suction strainer apparatus 10 hereof, the strainer apparatus comprises a walled housing 12 enclosing an interior space 14, the housing including first side wall 48 and second side wall 49, inlet wall 42 (not shown, see FIG. 2), back wall 40, top wall 46, and bottom wall 44. In an embodiment, best seen in FIG. 2, inlet wall 42 is angled upwardly from bottom wall 44 to top wall 46. In other embodiments, inlet wall 42 is angled up to join the top of back wall 40, and there is no top wall 46. The walls of the housing can have any width, but should be wide enough to withstand impact from a flow of liquid containing solid particles or with suspended impurities, and strong enough to withstand suction forces from within the interior space. The walls can be welded together, soldered, glued or epoxied, or fixed together by any other means known in the art, or can be fabricated as an integrated whole, such as by molding and/or machining.

In some embodiments, the strainer apparatus 10 is provided with means for keeping it stable on uneven surfaces and or in turbulent liquids. These means can include a base plate 60 with or without attachment holes 62 for anchoring attachments, adjustable stabilizing arms and or telescoping armature or any other means known in the art. Base plate 60 can be welded, e.g., using stitch weld 64, screwed, e.g., utilizing attachment holes 62, or otherwise attached to the side walls of housing 12. In embodiments, base plate 60 is integral with or replaces bottom wall 44.

Back wall 40 comprises an outlet aperture 18 for strained liquid exiting the strainer apparatus, connected to a tube, pipe, hose or spout (not shown) for receiving liquid from outlet aperture 18. The connector 84 between outlet aperture 18 and the pipe, hose, or spout (best seen in FIG. 2) comprises an outlet flange 70 comprising a raised circular coupling 74 comprising tapered threads 72 designed to connect with the tube, pipe, hose, or spout. In the embodiment shown, connector 84 is a three inch NPT (National Pipe Thread Tapered Thread) right-handed PVC flanged, thread-type coupling.

In an embodiment, the strainer housing 12 is constructed out of metal panels that are spot and stitch welded together and attached to base plate 60. Base plate 60 can be longer and or wider than a pump housing (not shown) that houses a pump connected to outlet aperture 18 of strainer housing 12 via circular fitting 74. In this embodiment, base plate 60 can be provided with attachment holes 62, such as 9/32" holes in its corners for anchoring strainer housing 12.

Figure 2:
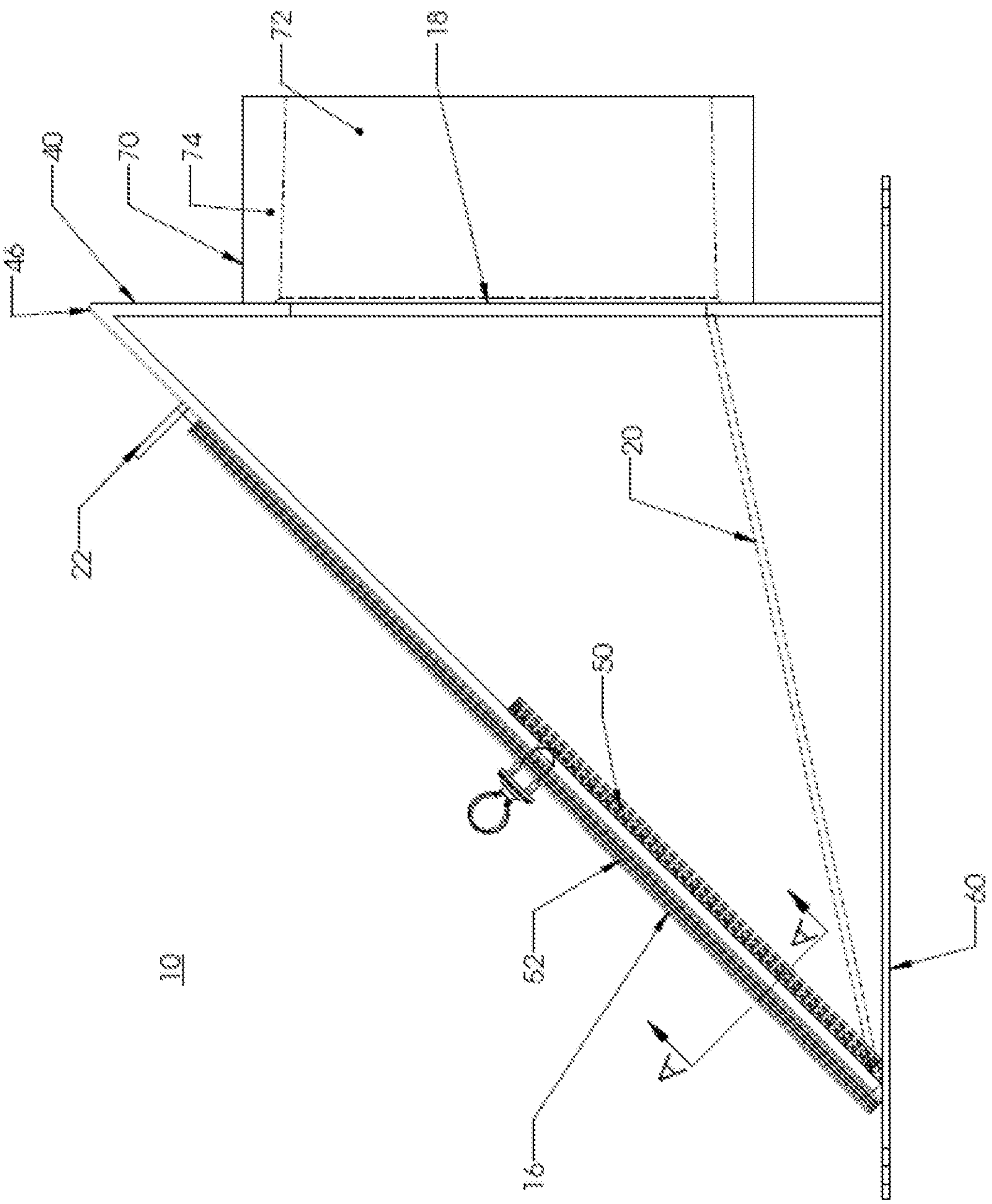
FIG. 2 is a cross-sectional view of the strainer apparatus along Line B-B of FIG. 1 showing the flow ramp and sliding door assembly.

The apparatus also comprises a flow ramp 20 having a width coextensive with the width of back wall 40 and extending in a downward taper to meet bottom wall 44, in embodiments flow ramp 20 meets bottom wall 44 at its junction with inlet wall 42 (best seen in FIG. 2). In embodiments, the angle of flow ramp 20 is about 10 although as will be appreciated by those of ordinary skill in the art, the ramp can be designed with other angles of incline consistent with efficient liquid flow. In embodiments, flow ramp 20 is spot welded to side walls 48 and 49, typically at four places.

FIG. 2 is a cross-sectional view of the strainer apparatus along Line B-B of FIG. 1 showing flow ramp 20 and a sliding door assembly affixed to inlet wall 42. The sliding door assembly comprises sliding door 22 shown in full open position, in tracks 52 affixed to inlet wall 42. Sliding door 22 is slidably engaged with tracks 52 which are placed on inlet wall 42 parallel to each other, each engaging with opposite sides of sliding door 22. Tracks 52 can be crimped tracks and can be spot welded or otherwise fixedly attached to the strainer housing.

Figure 3:
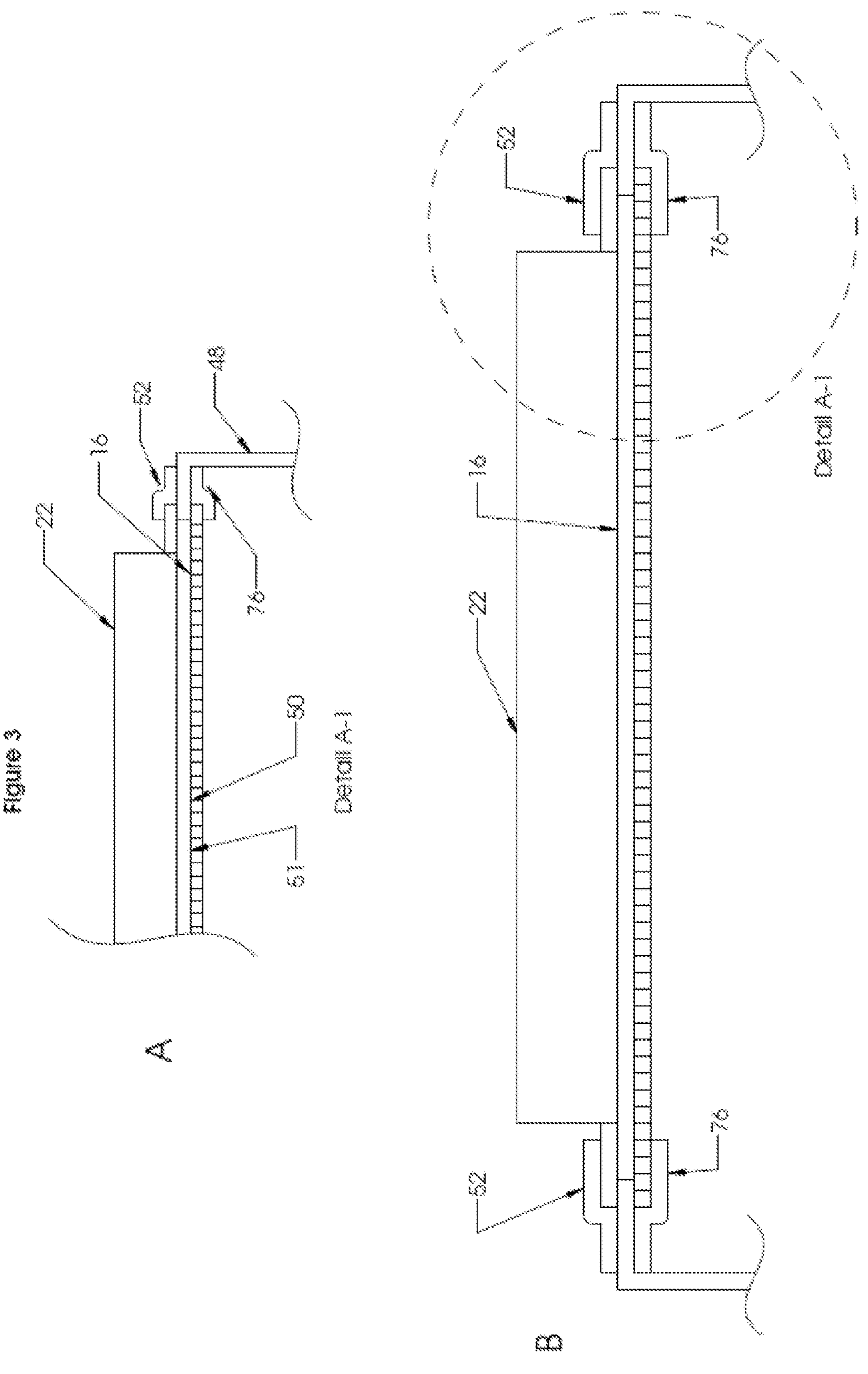
FIG. 3A is a cross-sectional view taken along line A-A of FIG. 2, and illustrates detail of part of the sliding door of a liquid intake adjustment mechanism.
FIG. 3B is an extended view of the embodiment shown in FIG. 3A showing a complete cross-section of the sliding door assembly comprising the sliding door slidably engaged with tracks on both sides.

FIGS. 3A and 3B show enlarged views of the sliding door assembly along line A-A of FIG. 2, looking upward at the bottom of sliding door 22. FIG. 3A is a cross-sectional view taken along line A-A of FIG. 2 showing detail of a sliding door embodiment of the liquid intake adjustment mechanism. Sliding door 22 is slidably engaged with crimped tracks 52, which are spot welded to inlet wall 42 (see FIG. 1) near first side wall 48. Sliding door 22 is shaped and sized to completely or substantially completely cover strainer element 50 and strainer inlet aperture 16 and to be slidably raised and lowered on tracks 52 to cover any part of strainer element 50 and strainer aperture 16 that are or become exposed to air, i.e., are not submersed beneath the liquid being strained. Strainer element 50, shown in the form of a perforated plate, is held in place by bracket 76, which is also spot welded to inlet wall 42.

FIG. 3B is an extended view of the embodiment shown in FIG. 3A showing a complete cross-section of the sliding door assembly comprising sliding door 22 slidably engaged with tracks 52 on both sides. Strainer element 50 is also shown beneath strainer aperture 16 held in place by brackets 76.

Figure 4:
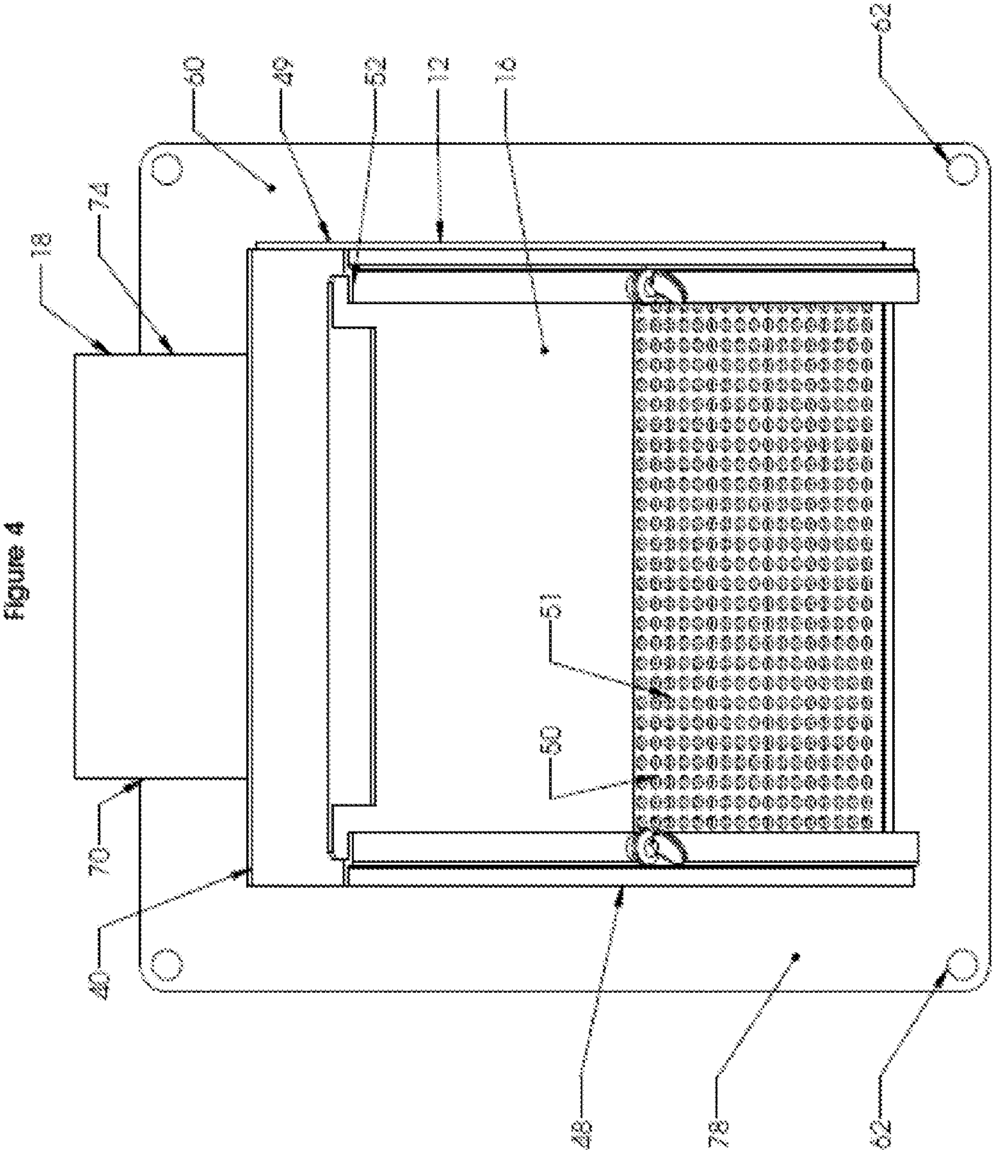
FIG. 4 is a top view of the sliding door assembly in partially open position.

FIG. 4 is a top view of the sliding door assembly in partial open position, showing sliding door 22 having been slid downward in tracks 52 such that it covers the part of strainer element 50 and inlet aperture 16 that are above the liquid level (element 78 shown in FIG. 2), and would otherwise be exposed to air. Inlet aperture 16 is fitted with strainer element 50. Strainer element 50 is depicted as a perforated plate comprising perforations 51, and is co-extensive with inlet aperture 16 and held in place by brackets 76 (best seen in FIGS. 3 A and B) attached to inlet wall 42. Tracks 52 are mounted on inlet wall 42. Inlet wall 42 is attached to first side wall 48 and second side wall 49 as well top wall 46. Top wall 46 is attached to back wall 40, which is equipped with outlet connector 84 comprising outlet aperture 18 in raised circular coupling 74.

In embodiments strainer element 50 is designed to be easily interchanged with other strainer elements having different filtering capabilities for ease of use in straining impurities of different sizes. Strainer element 50 can be provided in many different embodiments depending on the size and nature of the impurities and the unstrained liquid. Strainer element 50 can be a perforated plate, made of metal, plastic or other suitable material. The perforations 51 can be uniform in size, shape and spacing, or can be of any size, shape and spacing which enhances liquid intake and or straining capacity, for example, in some embodiments the perforations can be larger nearer the top of the apparatus and smaller nearer the bottom of the apparatus depending on the size of the impurities and their level of suspension in the liquid. In embodiments, the strainer element 50 is a perforated, rectangular plate with equally spaced round perforations 51 about a quarter of an inch in diameter, configured along a substantially planar surface, and is capable of being interchanged for a different strainer plate. In other embodiments, strainer inlet aperture 16 can comprise a strainer element that is a diaphragm filter capable of straining out impurities based on size or chemical composition, or can comprise any other filter element known to the art. As used herein, a "diaphragm filter" is a porous plate or membrane separating two liquids, as in a galvanic cell, or a semipermeable membrane. One of ordinary skill in the art is able to select an appropriate strainer element for use depending on the size and nature of the impurities and the liquid being strained.

Strainer element 50 can be integral to inlet wall 42, or can be interchangeably attached thereto, via brackets, tracks, or other means known to the art. Strainer inlet aperture 16 as shown in FIG. 2 is planar and extends along inlet wall 42 following the incline of the inlet wall. In other embodiments, inlet wall 42 can be stepped, and strainer inlet aperture 16 can take up part or the entire vertical or horizontal surface of the lowest step and can be at about a 90° to 180° angle to bottom wall 44.

Other conformations of inlet wall 42 and strainer inlet aperture 16 are possible including those having the inlet wall tilted at about a 45° angle with bottom wall 44, or at any angle equal to or greater than about 5° and up to about 90°. Too acute an angle, less than approximately 5°, generally impedes the free flow of liquid. In such embodiments, top wall 46 is enlarged or made smaller so that its edge still meets the top edge of inlet wall 42.

In embodiments, the strainer apparatus 10 and its parts such as inlet aperture 16 and strainer element 50 can be configured along three-dimensional surfaces of any shape including, but not limited to wavy, stepped, concave, convex, and various combinations thereof, the particular shape and configuration depending on the nature of the impurities, the liquid to be strained, and features of the environment surrounding the strainer apparatus. For example, the strainer apparatus can be used to pump liquid from a well or narrow tube, from uneven cracks in a rock formation, from a muddy or pebbly surface, or other environments.

Strainer element 50 is sized and shaped so as to cover all or any part of strainer inlet aperture 16 that in use is exposed to air or water. The sliding door 22 is part of a liquid intake adjustment mechanism comprising sliding door 22 and tracks 52. This mechanism is designed for adjusting the area of strainer element 50 that is exposed to unstrained liquid while ensuring strainer inlet aperture 16 remains closed to the atmosphere.

In embodiments sliding door 22 can move on tracks 52 from a completely open position in which the entire surface of strainer element 50 is exposed to a liquid to be strained to a completely or substantially completely closed position in which sliding door 22 does not allow any appreciable amount of liquid (i.e., any amount of liquid that would interfere with functioning of the apparatus, to enter interior space 14 of the apparatus. Sliding door 22 can be adjusted from its position entirely or substantially entirely covering strainer inlet aperture 16 to cover only part of inlet aperture 16, and sliding door 22 and/or aperture 16 can comprise one or more positive stops, such as door stop 80 shown attached to sliding door 20 by means of an optional cable 88 (FIG. 2), or other positive stop(s) known to the art. The positive stop 80 holds sliding door 22 in partially open position(s) so that any part of inlet aperture 16 which is above the liquid level and open to the atmosphere is covered, and air cannot enter the interior space 14 of the apparatus. Thus the effective open portion of strainer inlet aperture 16 open to unstrained liquid always remains below the top level of the liquid and closed to the atmosphere.

In other embodiments, the sliding door assembly can be replaced by another liquid intake adjustment mechanism of any shape and material which is capable of moving up and or down over the strainer inlet aperture while effectively adjusting the area and position of strainer inlet aperture exposed to unstrained liquid. Examples include, but are not limited to liquid intake adjustment mechanisms which slide, roll, fold, expand and or contract hydraulically or pneumatically, or any combinations thereof, or any other means known in the art which allow effective adjustment of the area and position of the strainer inlet aperture exposed to unstrained liquid. The liquid intake adjustment mechanism can be adjusted manually, or can be operated by automated devices that are capable of measuring the liquid level, including but not limited to, one or more floats or other mechanical devices or various electronic apparatuses designed to measure liquid levels and send a signal to a servomotor operating the liquid adjustment mechanism.

In use the strainer apparatus 10 is hooked up to a pump and intake conduit for the pump (not shown) by means of outlet connector 84. Strainer apparatus 10 is positioned such that inlet aperture 16 is fully or partially submersed in the liquid to be strained. Sliding door 22 is adjusted so that its bottom edge is at or below the liquid level 78 so that the surrounding atmosphere is blocked from entering inlet aperture 16 and interfering with pump efficiency. As the liquid enters inlet aperture 16, strainer element 50 filters the liquid as it flows through perforations 51, leaving any objects in the liquid that are larger than perforations 51 outside the apparatus. The filtered liquid exits the apparatus through outlet aperture 18, from whence it may be further conducted for reuse, further processing, or disposal. If liquid level 78 becomes lower during pumping, sliding door 22 can be adjusted downward so that its bottom edge (defining the size of the inlet) remains at or below water level. If liquid level 78 becomes higher during pumping, sliding door 22 can be adjusted upward to allow maximum liquid to move through the device and be filtered.

The foregoing description is based on an orientation of strainer apparatus 10 as depicted in the figures, in which base plate 60 is parallel to the ground and orthogonal to the force of gravity. The apparatus may also be used in different positions, including upside-down positions such that the force of gravity assists in clearing debris from strainer element 50. In such altered positions, the placement and direction of travel of sliding door 22 can be altered as necessary to accommodate the conditions of use such that the sliding door can move upward or downward relative to the liquid level.

It will be appreciated that many embodiments of the strainer apparatus hereof are possible by substituting equivalent components that perform the same functions for the components illustrated herein.

The invention claimed is:

1. A liquid-intake filter assembly, comprising:

a housing having an inlet aperture and an outlet aperture;

a filter element sized to completely cover said inlet aperture; and a liquid-intake-adjustment assembly including:

a sliding-door assembly including:

a set of parallel tracks flanking said inlet aperture; and a sliding door slidably engaged with said parallel tracks and positionable to cover all or a portion of said inlet aperture;

wherein said sliding door is movably positionable to close-off any portion of the inlet aperture that is open to air, thereby allowing only liquid into the housing.

2. The liquid-intake filter assembly of claim 1, wherein said filter element is fixedly or removably attached to said housing.

3. The liquid-intake filter assembly of claim 2, wherein said filter element is a perforated plate filter.

4. The liquid-intake filter assembly of claim 2, wherein said filter element is a diaphragm filter.

5. The liquid-intake filter assembly of claim 1, further comprising a base plate.

6. The liquid-intake filter assembly of claim 1, wherein:

said housing comprises side walls, attached to a bottom wall and a top wall, a back wall and an inlet wall;

said inlet wall comprises said inlet aperture; and said inlet wall is attached along its bottom edge to said bottom wall and along its top edge to the top wall, and is inclined at an angle between about 5° and 90° with said bottom wall.

7. The liquid-intake filter assembly of claim 6, further comprising a flow ramp disposed within said housing and angled upwardly from a point on said bottom wall proximal to said inlet wall toward said back wall, wherein the top of said flow ramp abuts said back wall at or above the level of said outlet.

8. The liquid-intake filter assembly of claim 1, further comprising a connector for attachment of said outlet aperture to a suction device.

9. The liquid-intake filter assembly of claim 8, further comprising:

a suction device connected to said connector; and a flow ramp positioned between the inlet and outlet apertures.

10. The liquid-intake filter assembly of claim 9, further comprising a bottom wall and/or base plate, wherein said filter element is set at an angle greater than about 5° to said base plate.

11. A method of moving a liquid from one location to another comprising the steps of:

obtaining a liquid-intake filter assembly comprising:

a housing having an inlet aperture and an outlet aperture;

a filter element sized to completely cover said inlet aperture;

a liquid-intake-adjustment assembly including:

a sliding-door assembly including:

a set of parallel tracks flanking said inlet aperture; and a sliding door slidably engaged with said parallel tracks and positionable to cover all or a portion of said inlet aperture; and a connector for attachment of said outlet aperture to a suction device;

wherein said sliding door is movably positionable to close-off any portion of the inlet aperture that is open to air, thereby allowing only liquid into said housing;

connecting said liquid-intake filter assembly with a suction device operably connected to a conduit for said liquid terminating at a second location;

immersing said liquid-intake filter assembly so that at least a portion of the inlet aperture of said apparatus is beneath the level of the liquid at a first location; and activating said suction device;

whereby liquid is pulled through said apparatus into said conduit and moved to said second location.

12. The method of claim 11, wherein said filter element is selected from the group consisting of a perforated plate filter and a diaphragm filter.

13. The method of claim 12, wherein said filter element is fixedly or removably attached to said housing.

14. The method of claim 12, wherein said liquid is selected from the group consisting of water, liquid hydrocarbons, and mixtures thereof.

15. A method of making a liquid-intake filter assembly comprising the steps of:

providing a housing having an inlet aperture and an outlet aperture;

providing a filter element sized to completely cover said inlet aperture; and providing a liquid-intake-adjustment assembly including:

a sliding-door assembly including:

a set of parallel tracks flanking said inlet aperture;

a sliding door slidably engaged with said parallel tracks and positionable to cover all or a portion of said inlet aperture;

wherein said sliding door is movably positionable to close-off any portion of the inlet aperture that is open to air, thereby allowing only liquid into said housing.

16. The method of claim 15, wherein said filter element is fixedly or removably attached to said housing.

17. The method of claim 16, wherein said filter element is selected from the group consisting of a perforated plate filter and a diaphragm filter.

18. The method of claim 15, the method further comprising the steps of providing for said housing:

a base plate;

a bottom wall;

a top wall;

two side walls, attached to said base plate and said top wall;

a back wall; and an inlet wall;

wherein:

said inlet wall comprises said inlet aperture, and said inlet wall is attached along its bottom edge to said bottom wall and along its top edge to the top wall, and is inclined at an angle within the range of 5° to 90° with said bottom wall.

19. The method of claim 18, further comprising the steps of:

providing a flow ramp disposed within said housing and angled upwardly from a point on said bottom wall proximal to said inlet wall toward said back wall, wherein the top of said flow ramp abuts said back wall at or above the level of said outlet aperture; and providing a suction device connected to said connector.

20. The method of claim 15, further comprising the steps of:

providing a perforated plate as said filter element attached to said housing sized and shaped to completely cover said inlet aperture;

providing a connector operatively connected to said outlet aperture for connecting to a suction device; and providing a flow ramp positioned between the inlet and outlet apertures.

* * * * *